United States Patent [19]

Yorkgitis et al.

[11] Patent Number: 5,187,015

[45] Date of Patent: Feb. 16, 1993

[54] ICE RELEASE COMPOSITION, ARTICLE AND METHOD

[75] Inventors: Elaine M. Yorkgitis, Oakdale; Kurt C. Melancon, Saint Paul, both of Minn.

[73] Assignee: Minnesota Mining and Manufacturing Company, St. Paul, Minn.

[21] Appl. No.: 312,257

[22] Filed: Feb. 17, 1989

[51] Int. Cl.$^5$ ................................. B32B 9/06
[52] U.S. Cl. .................... 428/447; 427/387; 427/515; 525/478; 528/15; 528/31; 528/32
[58] Field of Search .................. 528/15, 31, 32; 525/428; 427/54.1, 387; 428/447; 524/730

[56] References Cited

U.S. PATENT DOCUMENTS

| | | | |
|---|---|---|---|
| 2,494,920 | 1/1950 | Warrick | 117/121 |
| 2,567,804 | 9/1951 | Davies | 224/134 |
| 2,823,218 | 2/1958 | Speier | 260/448.2 |
| 2,970,150 | 1/1961 | Bailey | 260/348 |
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,344,111 | 9/1967 | Chalk | 528/31 |
| 3,416,945 | 12/1968 | Schladitz | 117/61 |
| 3,516,946 | 6/1970 | Modic | 252/429 |
| 3,522,202 | 7/1970 | Wada et al. | 260/33.2 |
| 3,579,540 | 5/1971 | Ohlhausen | 260/33.4 |
| 3,715,334 | 2/1973 | Karstedt | 260/46.5 |
| 3,814,730 | 6/1974 | Karstedt | 260/46.5 |
| 4,271,215 | 6/1981 | Coon | 427/387 |
| 4,301,208 | 11/1981 | Jellinek et al. | 428/334 |
| 4,472,563 | 9/1984 | Chandra et al. | 528/15 |
| 4,504,645 | 3/1985 | Melancon | 528/15 |
| 4,510,094 | 4/1985 | Drahnak | 260/429 |
| 4,530,879 | 7/1985 | Drahnak | 428/352 |
| 4,533,575 | 8/1985 | Melancon | 427/387 |
| 4,559,396 | 12/1985 | Sasaki et al. | 528/15 |
| 4,595,739 | 6/1986 | Cavezzan | 528/15 |
| 4,600,484 | 7/1986 | Drahnak | 204/157.74 |
| 4,636,324 | 1/1987 | Murase et al. | 252/70 |
| 4,640,939 | 2/1987 | Cavessan et al. | 522/99 |
| 4,670,531 | 6/1987 | Eckberg | 528/15 |
| 4,681,963 | 7/1987 | Lewis | 556/453 |
| 4,689,384 | 8/1987 | Kondow et al. | 528/15 |
| 4,705,765 | 11/1987 | Lewis | 502/152 |

FOREIGN PATENT DOCUMENTS 0206669 12/1986 European Pat. Off.
3541100.7 11/1985 Fed. Rep. of Germany.
WO8800285 1/1988 PCT Int'l Appl.

OTHER PUBLICATIONS

E. H. Andrews et al. (J. Mater. Sci., 13, 1680-88 (1978); 18, 1455-1465 (1983); 19, 73-81 (1984)).

Primary Examiner—Melvyn I. Marquis
Attorney, Agent, or Firm—Gary L. Griswold; Walter N. Krin; Steven E. Skolnick

[57] ABSTRACT

An article capable of repeatedly releasing ice from its surface is provided. Also provided is a composition capable of providing such release. The article and composition employ a polysiloxane having terminal ethylenic unsaturation, a polyhydrosiloxane, a platinum- or other metal-containing hydrosilation catalyst, and optionally, a non-functional polysiloxane free from ethylenic unsaturation. When applied to a surface and crosslinked, the article has a coating having a coating weight of at least 3 g/m$^2$.

21 Claims, 3 Drawing Sheets

Fig. 6

ICE RELEASE COMPOSITION, ARTICLE AND METHOD

TECHNICAL FIELD

This invention relates to compositions and articles capable of repeatedly releasing ice and to methods for providing surfaces capable of providing such release.

BACKGROUND ART

Ice build-up on the surfaces of such things as sign faces, signal transmission lines (e.g., telephone and electrical cables), automobiles, railroad cars, aircraft, heat exchange equipment, ice manufacturing facilities, buildings, transportation signs, roofing, snow removal equipment and the like presents a long recognized problem. While it is highly preferred to prevent ice build-up on such surfaces, no truly effective method of doing so has yet been found. Consequently, most techniques for resolving this problem involve techniques for the removal of an accumulation of ice from surfaces.

Thermal removal has been suggested. However, this technique requires a significant expenditure of energy and is generally ineffective where the ambient temperature is low.

Another technique involves the application of a silicon-containing coating to surfaces. However, this technique is not entirely satisfactory. U.S. Pat. No. 2,567,804 describes the use of a multilayer coating in which an organosilicon halide is first applied to the surface and then a prepolymerized silicone is applied thereover. The prepolymerized silicone has a viscous oily or greasy consistency. This approach suffers from the disadvantage of requiring the application of two separate layers of material. Additionally, the greasy top layer is aesthetically unpleasing and unsuitable for applications where repeated hand contact is to be made.

U.S. Pat. No. 3,522,202 describes the use of a composition consisting of (a) a dimethylpolysiloxane-containing terminal silicon bonded hydroxyl groups, (b) a methyl hydrogen polysiloxane, and (c) a methylphenyl-polysiloxane containing terminal hydroxyl groups. This composition is applied from an organic solvent. As such, it not only presents potential pollution problems, it also necessitates the use of expensive solvent recovery systems. The use of solvent also adds a potential safety hazard.

U.S. Pat. No. 3,579,540 describes the use of a composition comprising a mineral acid, a solvent and an alkyl-polysiloxane to render a nonporous surface water repellent. This composition also presents pollution and safety problems in its application. Additionally, however, the use of mineral acids presents problems of corrosion and also depolymerization of the polysiloxanes employed.

U.S. Pat. No. 4,271,215 discloses the application of a coating composition comprising a carboxy-functional siloxane fluid, an organic titanate, and a volatile diluent to a water-impermeable surface to give it ice release properties. This composition also presents pollution and safety problems in its application.

U.S. Pat. No. 4,301,208 discloses the application of a coating comprising a block copolymer of polycarbonate and dimethylpolysiloxane containing a silicone oil to render a surface capable of releasing ice. This composition is applied from solvent and accordingly presents the above-identified pollution and safety problems. Furthermore, it is a thermoplastic composition and the literature indicates that it has poor adhesion to some substrates. Still further, the resulting material is only physically crosslinked. This type of crosslinking is reversible unlike that of the compositions employed in the present invention.

U.S. Pat. No. 4,636,324 discloses the use of a composition comprising 40 to 99.6 weight % of an organopolysiloxane, 0.2 to 30 weight % of an alkali metal salt, and 0.2 to 30 weight % of a liquid and/or a solid paraffin. U.S. Pat. No. 4,448,919 discloses the use of a composition comprising from 70 to 99.8 weight percent of an organopolysiloxane and 0.2 to 30 weight percent of an alkali metal salt. The alkali metal salts employed in the '324 and '919 compositions can be leached out of the compositions, decreasing their ice-releasing capabilities and causing corrosion problems.

German Offenlegungsschrift DE 3451100 A1 describes the use of a composition containing $\alpha$- and $\omega$-dihydroxypropyl(dioganosiloxanes), alkyl-triacetoxysilanes, fillers, pigments, solvents, and optionally $\alpha,\omega$-bis(trimethylsiloxy)poly(dimethylsiloxane). This composition employs a silanol functional polysiloxane. In addition, it is applied at a thickness of 1.5 mm. This corresponds to a coating weight of approximately 1500 $g/m^2$ and is significantly heavier than is employed in the present invention.

Yet another approach that has been tried is the use of polytetrafluoroethylene to reduce the adhesion of ice on surfaces. Again, however, this approach has not proven to be entirely satisfactory. This technique requires the application of a coating or layer of a fairly expensive polymer and provides a surface which, at best, provides only marginal ice release capabilities.

U.S. Pat. Nos. 4,504,645 and 4,533,575 disclose the use of latently curable organosilicone release coating compositions which are applied as a thin layer (e.g. 1 $g/m^2$) to provide release from an adjacent adhesive layer. Thin coatings of this type do not provide suitable ice release capability.

International Application No. PCT/GB 88/00285 discloses a system for releasing ice from a surface which employs a two component polymeric coating on a surface. The first component is not removable from the surface by solvents. The second component is dissolved or dispersed homogeneously in the first component but is not bonded to the first. The first component is physically or chemically grafted to the surface and more preferably contains a reactive end or side group. The second component preferably has an oily, waxy or greasy consistency. Mineral oils, organic polysiloxanes, fluorinated polymers, ethylene/propylene copolymers and polyurethanes are said to be useful as the first and second components.

U.S. Pat. No. 2,494,920 describes the application of a coating containing an organopolysiloxane, a heat resistant inorganic filler, and a peroxide (such as a diacyl peroxide). The composition is applied to a substrate and then baked until it has reached a temperature of 180° C. for two minutes. This composition is said to render surfaces water repellent. However, the use of fillers tends to render the composition opaque and hence unsuitable for many applications. Moreover, the use of high temperatures to polymerize the coating is undesirable.

DISCLOSURE OF THE INVENTION

In accordance with the present invention, there is provided an article capable of repeatedly releasing ice from its surface. The article has a coating present on at least one of its surfaces at an average coating weight of at least 3 g/m². The coating comprises a crosslinked organosilicone material which results from the crosslinking of a composition containing (a) a polysiloxane having terminal ethylenically unsaturated groups, (b) a polyhydrosiloxane, (c) a metal-containing hydrosilation catalyst, and optionally, (d) a nonfunctional polysiloxane free from ethylenic unsaturation. As used herein, the term "nonfunctional" refers to a material which does not partake in the crosslinking reaction.

There is also provided a novel composition which contains, as essential ingredients, components (a), (b), and (c), and at least 0.01% by weight of component (d).

Still further there is provided a method of rendering a surface capable of repeatedly releasing ice comprising the application of the above-described composition or compositions to the surface and crosslinking the composition via a hydrosilation reaction so that a final layer of the coating is present at an average coating weight of at least 3 g/m².

The ice release properties of the present invention are described hereinafter by the term Θ whose units are Joules per square meter (J/m²). The Θ values reported herein are a measure of the ease of removing ice from a surface. Lower Θ values indicate easier removal. Average Θ values are reported.

Typically (and preferably) the surfaces resulting from crosslinking the coating composition have an average Θ value of 0.3 J/m² or less. Moreover, in the more preferred aspects of the invention the surface has an average Θ value of 0.2 J/m² or less and most preferably 0.1 J/m² or less.

The present invention also provides a simple, low cost technique for rendering a surface capable of releasing ice, preferably repeatedly. Moreover, in the more preferred aspects of the invention, the coating can be applied in a solvent-free system, thereby overcoming the pollution and safety disadvantages previously identified.

These and other advantages of the invention will be further discussed in the following portion of the specification.

DETAILED DESCRIPTION

The composition employed in the invention comprises a latently curable organosilicone composition that preferably is a fluid. It comprises (a) a polysiloxane component having terminal ethylenically unsaturated groups and (b) a polyhydrosiloxane component which functions as a crosslinking agent, (c) a metal-containing catalyst, and optionally, (d) a nonfunctional polysiloxane. An organic hydrosilation inhibitor (component (e)) may also be present.

The composition crosslinks through a hydrosilation reaction between components (a) and (b). This involves the reaction of an organic silicon-containing compound having a plurality of silicon bonded hydrogen atoms with a compound containing at least two aliphatic unsaturations.

Although the composition useful in the invention can be applied from an organic solvent, it is preferably applied without the use of such solvents so as to eliminate the use of energy to remove the solvent and to avoid pollution problems and safety hazards. Thus, while compositions having a wide range of viscosities (e.g., 20 to 3,000,000 centistokes at room temperature) can be employed, it is preferred that the viscosity be such that dissolution of the components in solvents is unnecessary. To this end, it has been found that viscosities of from 20 to 50,000 centistokes provide a solventless coating composition. Preferably the solventless coating composition has a viscosity of from 20 to 20,000 centistokes and more preferably from 20 to 10,000 centistokes.

Component (a)

The ethylenically terminated polysiloxane useful herein (sometimes also referred to as either the ethylenically unsaturated polysiloxane or component (a)) may have viscosities in the range specified above. It may be represented by the empirical structural formula $$R_a R_b^1 SiO_q \qquad \text{(FORMULA I)}$$

wherein each R is bonded to a silicon atom and is independently selected from the group consisting of monovalent aliphatic and aromatic hydrocarbon radicals and halogenated derivatives thereof, cyanoalkyl radicals, and combinations thereof such as 4-ethylphenyl, R having 1 to 13 carbon atoms and preferably 1 to 4 carbon atoms; $R^1$ is bonded to a silicon atom and is an ethylenically unsaturated aliphatic hydrocarbon monovalent radical having 2 to 6 carbon atoms; q equals (4-a-b)/2 wherein a is a number from 0 to 3 and preferably 0.5 to 2; b is a number from 0.005 to 2.0, and preferably 0.05 to 2.0; and the sum of a and b is equal to a number from 0.8 to 3.

As to materials represented by formula I above, the ethylenically unsaturated polysiloxanes include normally fluid materials which are preferably, but not necessarily, free of silanic hydrogen. Included among useful R groups are alkyl, such as methyl, ethyl, propyl, isopropyl, butyl, 2-ethylhexyl, octyl, and dodecyl; cycloalkyl, such as cyclopentyl, cyclohexyl, and cycloheptyl; aryl, such as phenyl, naphthyl, tolyl, and xylyl, aralkyl, such as benzyl, phenylethyl, and phenylpropyl; alkenylaryl, such as 4-vinylphenyl, aralkenyl, such as styryl, halogenated derivatives of the aforesaid groups such as 3,3,3-trifluoropropyl, chloropropyl, chlorophenyl, dibromophenyl, tetrachlorophenyl, and difluorophenyl, cyanoalkyl, such as beta-cyanoethyl, gamma-cyanopropyl, and beta-cyanopropyl. R is preferably methyl. Formula I is intended to include those substances wherein R is a combination of the aforesaid groups to provide a variety of structural units.

$R^1$ in formula I contains ethylenic unsaturation. Among useful groups represented by $R^1$ are alkenyl, such as vinyl, allyl, methallyl, isopropenyl, butenyl, and pentenyl. $R^1$ is preferably vinyl or allyl, and most preferably is vinyl.

The unsaturated polysiloxanes encompassed within the scope of formula I above are well known in the art as particularly described in U.S. Pat. Nos. 3,882,083, 3,344,111 and 3,436,366 which descriptions are incorporated herein by reference. Similarly, their preparation and/or commercial availability are also well known.

Specific materials included within the scope of the ethylenically unsaturated polysiloxanes of formula I above contain as few as one silicon atom. Materials containing more than one silicon atom, such as 1,3-divinyltetramethyldisiloxane, 1,1,3-trivinyltrimethyldisiloxane, 1,1,3,3-tetravinyldimethyldisiloxane, 1,1,1,3,3,3-hexavinyldisiloxane as well as high molecular weight polymers containing up to 10,000 or more silicon atoms per molecule are also included.

Preferred compounds of formula I are a vinyldimethylsiloxane endblocked polydimethylsiloxane of 20 to 50,000 centistokes, most preferably 20 to 20,000 centistokes. For solventless systems, viscosities of from 20 to 20,000 centistokes, preferably from 20 to 10,000 centistokes are preferred. Also included within the scope of the polydimethylsiloxanes of formula I are vinyldimethylsiloxane endblocked polydimethylsiloxane fluids with up to 20 percent, preferably no more than 5 percent, by weight of the dimethylsiloxy units replaced by diphenylsiloxy units. Also included within the scope of the ethylenically unsaturated polysiloxanes of formula I are cyclic compounds containing silicon bonded vinyl or allyl radicals, such as the cyclic trimer, tetramer, or pentamer of methylvinylsiloxane, $[(CH_2=CH)(CH_3)(SiO)]_z$, or methylallylsiloxane, $[(CH_2=CH-CH_2)(CH_3)(SiO)]_z$, wherein subscript z is an integer of 3 to 10. Other examples of such materials are tetramethyltetraallylcyclotetrasiloxane and tetramethyltetravinylcyclotetrasiloxane.

Component (b)

The polyhydrosiloxane compounds or polymers useful as component (b) have structural units represented by the following empirical formula.

$$R_aH_bSiO_q \qquad \text{(FORMULA II)}$$

wherein R, q, a and b are as described above. Also intended to be included within the scope of formula II are those wherein R is a combination of the aforesaid radicals. The R group of formula II preferably is methyl. The polyhydrosiloxane compounds represented by formula II above are also well known in the art and are described in U.S. Pat. Nos. 3,344,111 and 3,436,366 which descriptions are incorporated herein by reference. Also useful as component (b) are the hydride functional materials disclosed in U.S. Pat. No. 4,726,964 which are incorporated herein by reference.

Materials specifically encompassed within formula II above include 1,3-dimethyldisiloxane, as well as high polymers containing up to 10,000 or more silicon atoms per molecule. Also included within the scope of formula II above are cyclic materials, such as cyclic polymers of methyl hydrogen siloxane having the formula $(CH_3SiHO)_z$, wherein subscript z is an integer from 3 to 10. Particularly included is tetramethylcyclotetrasiloxane. Within the scope of formula II are hydrogen siloxane units ($HSiO_{1.5}$), methyl hydrogen siloxane units ($HSiCH_3O$) and dimethyl hydrogen siloxane units [$HSi(CH_3)_2O_{0.5}$].

The formula II component preferably has a viscosity of from 5 to 50,000 centistokes, more preferably a viscosity of from 5 to 20,000 centistokes and most preferably of from 5 to 10,000 centistokes.

The curable compositions preferably contain from 0.1 to 99.9 weight percent of component (a) with from 0.1 to 99.9 weight percent of component (b) such weight percentages being based on the weight of the total composition. Preferably, the curable compositions contain from 90 to 99 weight percent of component (a) and from 10 to 1 weight percent of component (b).

Component (c)

The hydrosilation catalysts employed in the compositions of the present invention include all of the well known platinum catalysts which are effective for catalyzing the hydrosilation reaction between silicon-bonded hydrogen groups and silicon-bonded ethylenic groups. These materials include, for example, finely divided platinum catalysts, such as those described in U.S. Pat. No. 2,970150, the chloroplatinic acid catalysts described in U.S. Pat. No. 2,823,218, the platinum hydrocarbon complexes taught in U.S. Pat. Nos. 3,159,601, and 3,159,662, as well as the platinum alcoholate catalysts described in U.S. Pat. No. 3,220,972. In addition, the platinum chloride-olefin complexes described in U.S. Pat. No. 3,416,946 are useful herein as are the platinum-vinylsiloxane complexes described in U.S. Pat. Nos. 3,516,946, 3,715,334 and 3,814,730. Still useful platinum catalysts are described in U.S. Pat. Nos 4,681,963 and 4,705,765 (colloidal platinum catalysts), and in U.S. Pat. Nos. 4,600,484, 4,530,879 and 4,510,094 (photoactivated platinum catalysts). All of the teachings of hydrosilation catalysts in the aforesaid U.S. patents are incorporated herein by reference.

The catalyst is generally present in an amount related to the amount of the ethylenically unsaturated radicals in the polysiloxane component and in an amount sufficient to cause the co-reaction of the ethylenically unsaturated polysiloxane, component (a), and the polyhydrosiloxane, component (b). The catalyst is preferably platinum and is present in sufficient amount to catalyze the hydrosilation reaction. When a platinum catalyst is used, satisfactory results may be obtained when the catalyst is present in amounts sufficient to provide as little as one part of platinum per million parts of the unsaturated polysiloxane. On the other hand, amounts of the platinum catalyst sufficient to provide as high as 1 to 10 parts of platinum per 1,000 parts of the unsaturated polysiloxane may also be used. In general, however, it is preferred to employ the platinum catalyst in an amount sufficient to provide one to two hundred parts of platinum per one million parts of the unsaturated polysiloxane component. Metals such as rhodium, iridium, and palladium, and their compounds are also known to catalyze these hydrosilation reactions and their use is intended to be within the scope of the present invention. Platinum and its compounds are the preferred catalyst.

Component (d)

Nonfunctional polysiloxanes useful in the invention are typically low molecular weight polymers which have an empirical structural unit represented by the following formula.

$$R_a^2R_b^3SiO_q \qquad \text{(FORMULA III)}$$

wherein $R^2$ and $R^3$ are alkyl groups which are each bonded to a silicon atom and may be the same or different. They are free from olefinic unsaturation but may otherwise be selected from the same materials useful as R. Preferably $R^2$ and $R^3$ are each methyl. These materials are normally fluid and are well known in the art and are commercially available from a variety of vendors including Dow Corning and Petrarch Systems. In Formula III, a, b, and q are as described above.

The materials useful as the formula III component preferably have viscosities in the ranges identified above for the formula I and formula II components.

Materials specifically encompassed within the scope of formula III are the trimethylsiloxy terminated polydimethylsiloxanes available from Petrarch Systems and Dow Corning.

The formula III component may be used alone or in combination with a number of other nonfunctional materials. Alternatively, these other nonfunctional materials may be used in place of the formula III component. These nonfunctional materials preferably do not cause gross phase separation of the composition and most preferably do not cause any incompatibility that can be visually detected. For example, paraffins (preferably liquid), polyethylene and polypropylene oxides, and the like may be employed. Other useful materials include polymer blends, block copolymers, graft copolymers, random copolymers, ionomers, alternating polymers and the like. Typically, these materials comprise up to 50 weight percent of component (d). Additionally, for those materials which exhibit multiple glass transition temperatures, these materials typically have a lowest glass transition temperature (Tg) below about $-10°$ C.

As with components (a) and (b), the viscosity of a liquid nonfunctional component preferably is from 20 to 50,000 centistokes. For solventless systems, viscosities of from 20 to 20,000 centistokes are preferred. More preferably, the viscosity is from 20 to 10,000 centistokes.

The curable composition preferably contains at least 0.01 weight percent of the nonfunctional component. It has been found, however, that at levels above 60 weight percent of the formula III component there is very little, if any, added decrease in the average $\Theta$ value. More preferably it contains from 0.01 to 60 weight percent of this component and most preferably it contains 0.01 to 40 weight percent of it.

Component (e)

Premature gelation-inhibiting compounds (component (e)) are not necessary in the composition. However they are preferably employed in those compositions which have not been sufficiently diluted by solvent to provide a reasonable working life (e.g., 5 minutes or more). Additionally, they are not necessary in those compositions in which components (a), (b) and (c) are mixed together and immediately applied.

Examples of such materials are known. See, for example, U.S. Pat. No. 4,504,645 at col. 6, line 3 through col. 7, line 29 (monoesters and monoamides of unsaturated aliphatic, 1,4-dicarboxylic acids). Other inhibitors are disclosed in U.S. Pat. No. 4,504,645 (alkylhydrogen maleates), U.S. Pat. No. 4,562,096 (hydrocarbonoxyalkyl maleates), U.S. Pat. No. 4,559,396 and U.S. Pat. No. 4,472,563 (ene-yne types), U.S. Pat. No. 4,595,739 (acetylenic alpha-ketones), U.S. Pat. No. 4,689,384 (halogen or alkoxy substituted olefins), and U.S. Pat. No. 4,670,531 and U.S. Pat. No. 4,640,939 (thermally or photo-triggered azodicarboxylates). The disclosure of these patents is incorporated herein by reference.

The inhibitor useful in the present invention is effective in inhibiting low and room temperature (e.g., 0° C. or lower and up to 40° C.) cure reactions while allowing rapid cures (e.g., less than 1 sec. to about 5 min. and preferably less than 30 sec.) at elevated temperatures, e.g., 50° C. to 200° C. Such inhibitory properties can provide a convenient pot life (which can be unusually long, e.g., more than 3600 hours) for the above-mentioned compositions, yet allow rapid curing when desired. Preferably the inhibitor used in the present invention is employed at concentrations of 0.5 to 300 times the weight of metal hydrosilation catalyst in the composition. The metal hydrosilation catalyst is present in sufficient amount to catalyze the hydrosilation reaction.

The latently curable organosilicone composition used in the present invention can be prepared by mixing, in any suitable fashion, all of components (a) to (e) plus any additional useful adjuvants, e.g., pigments, fillers, etc. As a result of the latent curing ability of these compositions, they can be stored as such and kept at low ambient or room temperature for extended periods of time until ready to be used. Alternatively, they may be premixed in separate containers. In this type of system, the catalyst is preferably added to component (a) and kept separated from component (b) until it is desired to mix them together.

A wide variety of substrates can be coated with the latently curable composition. For example, glass, ceramic, paper (including glassine, vegetable parchment, kraft), metal, polymeric films (such as cellophane, polyethylene, polypropylene, vinyl, acrylic, polyamide, polyester, and polyurethane) and the like may be used as the substrate.

The compositions may be coated onto the substrates by a variety of techniques such as roll coating, meyer bar coating, gravure coating, curtain coating, spraying, and the like.

Whatever the technique used, it has been found that a coating weight of at least 3 g/m$^2$ is necessary in order to provide repeated ice release properties. Preferably the coating weight is at least 6 g/m$^2$ and most preferably at least about 8 g/m$^2$.

Although it is not necessary to the present invention, it is preferred to treat the surface of the substrate prior to application of the curable organosilicone material to improve its adhesion to the surface. Any of a number of treatment compositions may be used including exposure to high energy radiation (e.g. corona, E-beam, etc.), chemical treatment such as by etching, mechanical abrasion and the application of chemical layers. Another useful treatment is disclosed in U.S. Pat. No. 4,749,617 issued Jun. 7, 1988 and pending U.S. patent application Ser. No. 745,261 filed Jun. 14, 1985 and now U.S. Pat. No. 5,057,371 and incorporated herein by reference. The compositions disclosed therein comprise an aziridine-functional material and, as optional ingredients, an organic resin and surfactant. Silane coupling agents may also be employed to improve adhesion. Such materials include amino-, epoxy, and other types of silane coupling agents. These materials are particularly suited to the treatment of metal surfaces. Still other adhesion promoters include the so called Forest Products Laboratory etch (FPL etch). This etch is useful in treating aluminum surfaces. Yet other commercially available treatments may be employed to improve adhesion as will be understood from this disclosure.

Objects and advantages of this invention are further illustrated by the following examples. The particular materials and amounts recited in these examples, as well as other conditions and details, should not be construed to unduly limit this invention.

In the following examples, vinyl-terminated polydimethylsiloxane (VDMS) which had empirical formula was used. In this formula, n represents the number of times the unit repeats and also the degree of polymerization (DP) of the VDMS.

In these examples the following test was used to determine Θ. Substrates to be coated and tested were provided. A layer of the composition was applied thereto and cured thereon. A section of the coated film was then fastened onto a flat-topped cylindrical brass holder having a central opening therethrough along its axis. Unless otherwise noted, fastening was accomplished with a silicone transfer tape. The outer diameter of the holder was 25.4 mm. The diameter of the central opening was 6.35 mm. The mounted films were trimmed at both the perimeter and central opening of the holder. This provided an opening through the center of the film to be tested. A 0.25 mm thick die-cut disk (13.1 mm diameter) of polytetrafluoroethylene-co-hexafluoropropylene film was coated on one side with a very thin layer of a conventional high vacuum silicone grease. The disk was applied (grease side down) to the top of the film to be tested. A 19 mm wide strip of a transparent tape was applied around the periphery of the test specimen and holder to create a cylindrical cavity. The resulting assembled piece was then placed a freezer at $-20°$ C. for about 1.5 hours to condition it. After conditioning, de-ionized water was poured into the cylindrical cavity. The thin layer of silicone grease that had been applied to the disk served to hold the disk to the sample and prevent leakage of water underneath the disk. After at least 1.5 hours at $-20°$ C. the water was frozen to a thickness of from 8 to 13 mm (usually 10-12 mm). The now completely constructed sample was attached to a testing rig in a vertical position and pressurized through its central opening till failure occurred. Either oil or air was used to pressurize each sample to failure. Oil pressurization was provided by a hydraulic pump which could generate at least 300 psi pressure. An air pocket located between the oil level and the FEP film prevented oil from contacting the film and sample prior to failure. However, once failure occurred, the sample was contaminated with oil. The air system operated with filtered compressed air at a maximum pressure of 90 psi. It was the air system which was used for cycling samples through multiple ice releases. Samples which failed at pressures consistently higher than 90 psi could be fairly tested only on the oil system. If tested on the air system, the voltage-time output of such samples would display a decreasing slope indicating that the applied pressure was inadequate. Time-to-failure for tests run on either system was 0.5 to 1.0 second. Pressure was monitored using a calibrated, voltage-emitting pressure transducer. The Θ value was calculated according to the published papers of E. H. Andrews et al. (J. Mater. Sci., 13, 1680-88 (1978); 18, 1455-1465 (1983); 19, 73-81 (1984)) using the pressure at failure, various measured or known dimensions, and certain constants. The Θ value was directly calculated using the formulae in these papers. These papers also describe a type of test rig used to measure Θ. Testing was generally done at $-17°$ C. to $-20°$ C., but usually at $-18°$ C.

Sample Preparation

The substrates used in these examples comprised biaxially oriented poly(ethylene terephthalate) film (PET) coated with an aziridine-functional composition containing the following ingredients:

|  | Parts |
| --- | --- |
| "Triton" 100[1] | 0.06 |
| CX-100[2] | 0.2 |
| Water | 99.74 |

[1]Sodium salt of alkaryl polyether sulfonate available from Rohm & Haas.
[2]Trimethylol-tris (-N-(methylaziridinyl)) propionate available from Polvinyl Chemical Industries.

The coating was first applied to a 3.5X length oriented PET using a No. 3 Air Knife and cured as it passed through the heat set zone of the tenter oven, generally maintained at 210°-245° C. Passage through this zone typically took from 5 to 30 seconds and also imparted 3.5X width orientation to the film. The final film was 75 microns thick.

A master coating composition was then prepared by mixing the following ingredients together as described in Example 1 of U.S. Pat. No. 4,504,645:

| Component | Grams |
| --- | --- |
| Vinyl-terminated polydimethylsiloxane (VDMS) (350 centistokes) | 98 |
| Trimethylsilyl-terminated poly(methylhydrogen siloxane) (30 centistokes) | 2 |
| 2-ethylhexyl hydrogen maleate | 0.25 |
| Platinum (as a platinum/divinyl tetramethyl disiloxane complex) | 100 ppm* |

*Parts per million of VDMS

The ice release compositions tested herein were then applied using either meyer bar or offset gravure coating techniques, and cured at 150° C. for from 1-2 minutes in an air circulating oven. Coating weights reported herein were determined using an Oxford Lab-X 1000 X-ray fluorescence analyzer available from Oxford Analytical Inc , One Dundee Park, Andover, Mass. 01810.

EXAMPLES 1-5

A series of ice release compositions employing the PET were prepared. Various amounts of nonfunctional polysiloxane (trimethylsiloxy-terminated polydimethyl siloxane having a viscosity of 350 centistokes) were added to portions of the master coating composition before coating and the resulting compositions were then applied to the PET in Examples 2-5. The master coating composition was applied to the PET in Example 1.

Sections of the coated film were then tested for Θ using the test procedure described above. Oil was the pressurization fluid employed. The results are reported in Table 1 in terms of θ whose units are Joules/square meter (J/m²). Each θ value is an average of measurements on from 4 to 6 samples. The column headed "Release No." refers to the number of times ice has been released from each sample set.

TABLE 1

| EX. | NONFUNCTIONAL POLYSILOXANE (WGT. %) | COATING WEIGHT (g/m²) | RELEASE NO. θ (J/m²) | | | | | | | | | | | | | |
|---|---|---|---|---|---|---|---|---|---|---|---|---|---|---|---|---|
| | | | 1 | 3 | 5 | 7 | 9 | 12 | 15 | 20 | 25 | 30 | 40 | 45 | 60 | 70 |
| 1 | 0 | ~7-8 | 0.115 | 0.1 | 0.08 | 0.045 | 0.12 | 0.07 | 0.11 | 0.1 | 0.115 | 0.125 | — | 0.064 | 0.106 | — |
| 2 | 20 | 7.43 | 0.045 | 0.095 | 0.13 | 0.08 | 0.07 | 0.125 | 0.095 | 0.1 | 0.045 | 0.1 | 0.102 | 0.09 | 0.07 | 0.09 |
| 3 | 40 | ~7-8 | 0.09 | 0.09 | 0.1 | 0.06 | 0.05 | 0.06 | 0.125 | 0.09 | 0.13 | 0.07 | 0.08 | 0.11 | 0.035 | 0.12 |
| 4 | 60 | 7.53 | 0.075 | 0.175 | 0.05 | 0.095 | 0.135 | 0.14 | 0.075 | 0.09 | 0.225 | 0.28 | — | 0.135 | — | — |
| 5 | 80 | 7.72 | 0.105 | 0.115 | 0.135 | 0.14 | 0.13 | 0.17 | 0.26 | 0.235 | 0.15 | 0.3 | — | 0.187 | — | — |

The data of Examples 1-5 are also graphically represented in FIGS. 1-5. These Figures respectively represent compositions containing 0%, 20%, 40%, 60% and 80% nonfunctional polysiloxane. In each FIG., the data points represent the average θ values.

EXAMPLES 6-10

A series of ice release compositions were prepared. The compositions used in the various examples were as follows where all quantities are in grams.

TABLE 2

| EX. | VDMS VISCOSITY (CENTISTOKES) | COATING WGT. (g/m²) | θ (J/m²) | PRESSURIZATION FLUID |
|---|---|---|---|---|
| 6 | 100 | 8.58 | 0.011 | AIR |
| 7 | 350 | 8.08 | 0.034 | AIR |
| 8 | 2,000 | 7.39 | 0.120 | OIL |
| 9 | 65,000 | 6.90 | 0.563 | OIL |
| 10 | 165,000 | 7.07 | 0.115 | AIR/OIL |

| COMPONENT | EXAMPLE | | | | |
|---|---|---|---|---|---|
| | 6 | 7 | 8 | 9 | 10 |
| VDMS | 47[1] | 98[2] | 40[3] | 30[4] | 35[5] |
| Trimethylsiloxyterminated poly(methylhydrogensiloxane), 30 centistokes | 0.96 | 2 | 0.8 | 0.6 | 0.7 |
| 2-ethylhexyl hydrogen maleate | 0.12 | 0.25 | 0.102 | 0.07 | 0.09 |
| Platinum (as a platinum/ divinyl tetramethyl disiloxane complex) | 100 ppm[6] | 10 ppm[6] | 100 ppm[6] | 100 ppm[6] | 100 ppm[6] |
| Heptane | — | — | 10 | 32 | 38.3 |

[1] Petrarch Systems PS 441 (100 centistokes).
[2] Same as Example 1 (350 centistokes).
[3] 2000 centistokes.
[4] Petrarch Systems 447.6 (65,000 centistokes).
[5] Petrarch Systems 448 (165,000 centistokes).
[6] Parts per million VDMS Where heptane was used (Examples 8, 9, 10), it was mixed with the VDMS well before the other ingredients were added. After being applied to the treated, biaxially oriented PET and cured as in Example 1, the resulting films were tested for θ as described above. The viscosity of the VDMS was varied in each Example. The results of the tests are given in Table 2. The θ values represent an average of from 4-6 measurements of θ for each material.

EXAMPLES 11-20

A series of ice release compositions were prepared, applied to treated, biaxially oriented PET, cured and tested for adhesion of ice to the coating as described in Examples 2-5, except that the viscosity of the nonfunctional polysiloxane material (trimethylsiloxy-terminated polydimethylsiloxane) was varied. The results of the tests are given in Table 3. The θ values represent an average of from 4-6 measurements for each material. Examples 13 and 14 are repeat tests using the compositions of Examples 2 and 3.

TABLE 3

| EX. | NONFUNCTIONAL VISC. (CSTOKES) | POLYSILOXANE WGT. % | COATING WGT. (g/m²) | θ (J/m²) | PRESS. FLUID |
|---|---|---|---|---|---|
| 11 | 50 | 20 | 8.55 | 0.059 | OIL/AIR |
| 12 | 50 | 40 | 8.50 | 0.069 | AIR |
| 13 | 350 | 20 | 8.04 | 0.147 | AIR |
| 14 | 350 | 40 | 8.04 | 0.132 | AIR |
| 15 | 12,500 | 20 | 7.71 | 0.088 | AIR |
| 16 | 12,500 | 40 | 7.47 | 0.139 | AIR/OIL |
| 17 | 60,000 | 20 | 7.28 | 0.268 | OIL |
| 18 | 60,000 | 40 | 10.32 | 0.245 | OIL |
| 19 | 300,000 | 20 | 6.76 | 0.291 | OIL |
| 20 | 300,000 | 40 | 6.10 | 0.494 | OIL |

EXAMPLES 21-23

A series of ice release compositions were prepared, applied to treated, biaxially oriented PET, cured and tested for adhesion of ice to the coating as described above in the general procedure and Example 1 except that the coating weight was varied. The results of the tests are given in Table 4. The Θ values represent an average of from 4-6 measurements for each material.

TABLE 4

| EX. | NONFUNCTIONAL POLYSILOXANE (WGT. %) | COATING WGT. (g/m$^2$) | θ (J/m$^2$) | PRESS. FLUID |
| --- | --- | --- | --- | --- |
| 21 | 0 | 1 | 0.522 | OIL |
| 22 | 0 | 8.08 | 0.034 | AIR |
| 23 | 0 | 11.25 | 0.097 | AIR |

EXAMPLES 24-26

Example 2 was repeated except that the coating weight was varied. The results are given in Table 5. The Θ values represent an average of from 4-6 measurements for each material. Air was used as the pressurization fluid in each example.

TABLE 5

| EX. | NONFUNCTIONAL POLYSILOXANE (WGT. %) | COATING WGT. (g/m$^2$) | θ (J/m$^2$) |
| --- | --- | --- | --- |
| 24 | 20 | 1.09 | 0.189 |
| 25 | 20 | 1.34 | 0.204 |
| 26 | 20 | 8.04 | 0.147 |

EXAMPLES 27-28

Example 3 was repeated except that the coating weight was varied. The results are given in Table 6. The Θ values represent an average of from 4-6 measurements for each material. Air was used as the pressurization fluid in both examples.

TABLE 6

| EX. | NONFUNCTIONAL POLYSILOXANE (WGT. %) | COATING WGT. (g/m$^2$) | θ (J/m$^2$) |
| --- | --- | --- | --- |
| 27 | 40 | 1.09 | 0.211 |
| 28 | 40 | 8.04 | 0.132 |

EXAMPLES 29-36

A series of coating compositions were prepared as in Example 1 from the following formulation:

| COMPONENT | GRAMS |
| --- | --- |
| VDMS (148 centistokes) | 50 |
| Trimethylsilyl terminated poly(methylhydrogen siloxane) (30 centistokes) | 1.02 |
| 2-ethylhexyl hydrogen maleate | 0.13 |
| Platinum (as a platinum/divinyl tetramethyl disiloxane complex) | 100 ppm* |

*Parts per million VDMS

The composition was applied at various coating weights to the PET as described above and tested for Θ. The results of the tests are given in Table 7 where all Θ values represent an average of from 4-6 measurements for each material. Oil was used as the pressurization fluid in all examples.

TABLE 7

| EX. | COATING WGT. (g/m$^2$) | θ (J/m$^2$) |
| --- | --- | --- |
| 29 | 0.34 | 0.69 |
| 30 | 0.68 | 0.68 |
| 31 | 1.00 | 0.39 |
| 32 | 1.54 | 0.38 |
| 33 | 2.21 | 0.33 |
| 34 | 3.75 | 0.18 |
| 35 | 5.25 | 0.20 |
| 36 | 8.54 | 0.05 |

Figure 1:
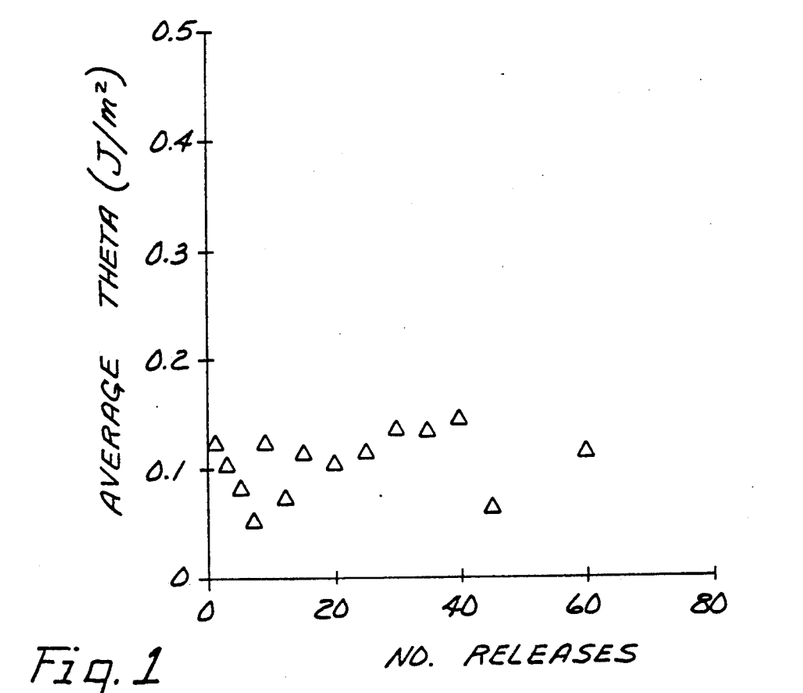
FIGS. 1-5 are graphic representations of average Θ versus ice release events at various levels of nonfunctional polysiloxane.
Figure 2:
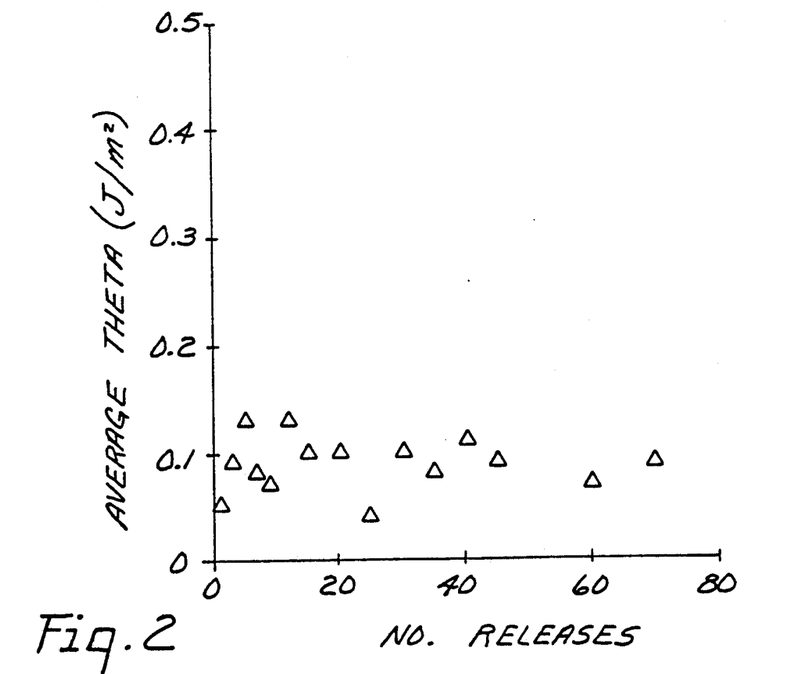
Figure 3:
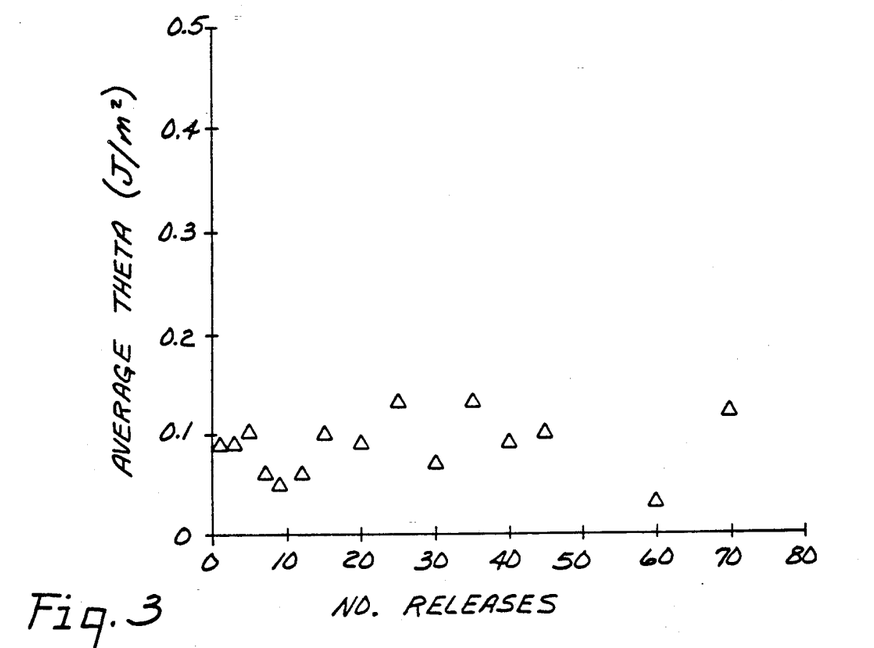
Figure 4:
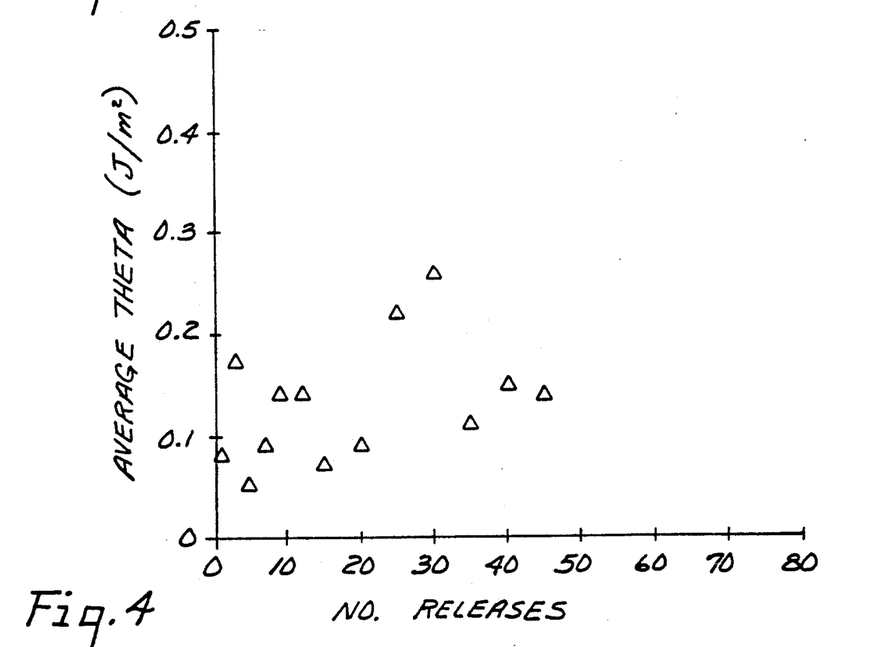
Figure 5:
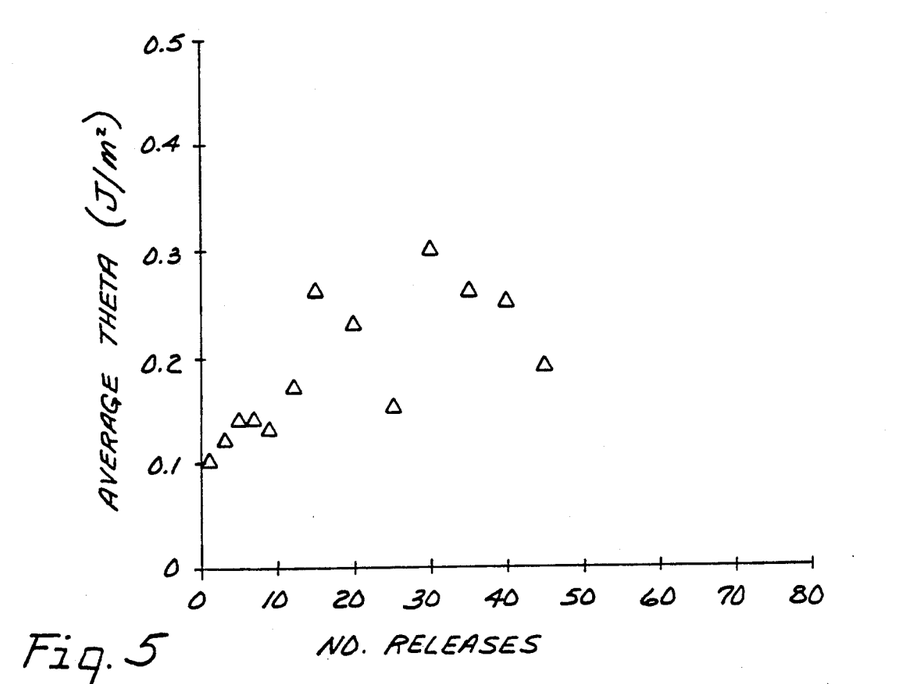
Figure 6:
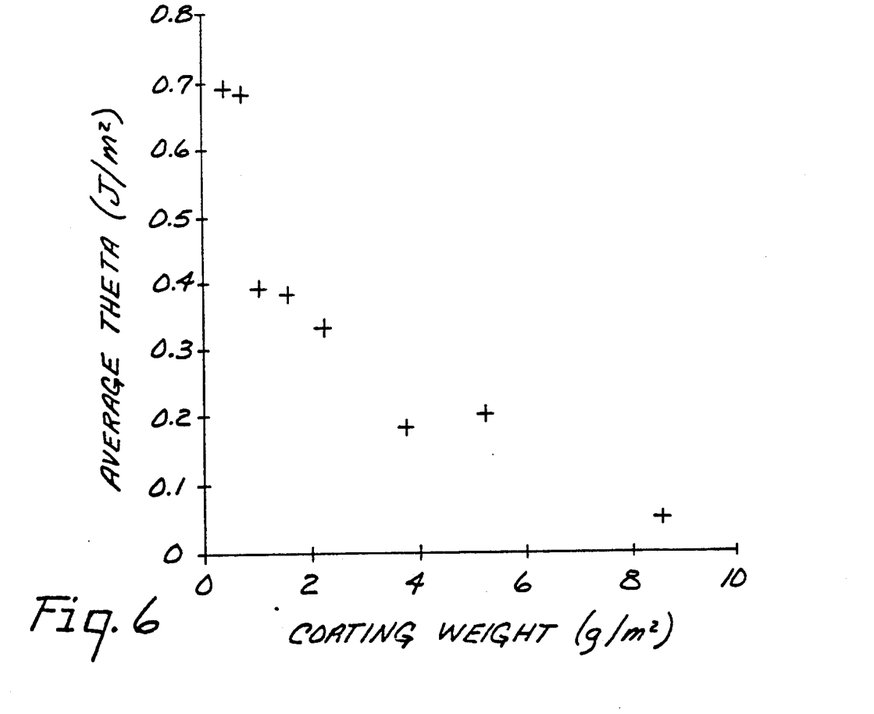
FIG. 6 is a graphic representation of average Θ versus coating weight.

These results are also illustrated graphically in FIG. 6. The data points represent the average Θ values. The average Θ value for PET itself (no ice release composition on it) was also measured and found to be 1.32 J/m$^2$.

EXAMPLES 37-41

An ice release composition was prepared from the following composition:

| COMPONENT | GRAMS |
| --- | --- |
| VDMS (100 centistokes) | 50 |
| Trimethyl terminated poly-(methylhydrogensiloxane) (30 centistokes) | 1.55 |
| 2-ethylhexyl maleate | 0.13 |
| Platinum (as a platinum/divinyl terminated trimethyl siloxane complex) | 100 ppm* |

*Parts per million VDMS

The ice-release composition was applied to a corona-treated polyethylene film either as is or combined with heptane. The coatings were cured for 5 minutes at 80° C. The resultant films were then tested for Θ as described above. Each Θ value is an average of measurements on from 4 to 6 samples. The results are set forth in Table 8.

TABLE 8

| EX. | COATING WGT. (g/m$^2$) | θ (J/M$^2$) | PRESS. FLUID | HEPTANE (WGT. %) | COATING METHOD |
| --- | --- | --- | --- | --- | --- |
| 37 | 1.06 | 0.92 | OIL | 0 | (a) |
| 38 | 2.72 | 0.59 | OIL | 50 | (b) |
| 39 | 4.78 | 0.69 | OIL | 50 | (c) |
| 40 | 8.74 | 0.17 | AIR | 0 | (c) |
| 41 | 10.84 | 0.13 | AIR | 0 | (c) |

(a) Gravure coater at 9/35 roll speeds
(b) #3 wire wound Meyer rod
(c) #6 wire wound Meyer rod

EXAMPLES 42-44

An ice release composition was prepared from the following composition:

| COMPONENT | GRAMS |
| --- | --- |
| VDMS (100 centistokes) | 50 |
| Trimethyl terminated poly(methylhydrogen siloxane) (30 centistokes) | 1.5 |
| 2-ethylhexyl hydrogen maleate | 0.13 |
| Platinum (as a platinum/divinyl tetramethyl di- | 100 ppm* |

-continued

| COMPONENT | GRAMS |
|---|---|
| siloxane complex) | |

*Parts per million VDMS

The ice release composition was applied to degreased aluminum which had been subjected to the Forest Products Laboratory etch. The ice release coating was applied and cured for 5 minutes at 150° C. as described in Examples 1-5. The coated aluminum plates were machined into circular samples and adhered to the sample mounts using a cyanoacrylate adhesive. They were then tested for $\Theta$ as described above using oil as the pressurization system. The results are given in Table 9.

TABLE 9

| EX. | COATING WGT. g/m$^2$ | $\theta$ (J/m$^2$) |
|---|---|---|
| 42 | ~1 | 0.99 |
| 43 | ~4 | 0.56 |
| 44 | ~8 | 0.12 |

We claim:

1. An article capable of repeatedly releasing ice from a surface thereof which comprises a coating of a crosslinked organosilicone material on said surface, said coating resulting from the crosslinking of a composition containing (a) a polysiloxane having terminal ethylenically unsaturated groups, (b) a polyhydrosiloxane, (c) a platinum- or other metal-containing hydrosilation catalyst in an amount sufficient to facilitate the crosslinking of said components (a) and (b), and (d) at least 0.01% by weight of a nonfunctional polysiloxane free from ethylenic unsaturation, wherein said coating is present at a weight of at least 3 g/m$^2$.

2. An article according to claim 1 wherein said composition further comprises an organic hydrosilation inhibitor in an amount sufficient to inhibit premature crosslinking of said composition at low temperature, but insufficient to inhibit crosslinking at elevated temperature.

3. An article according to claim 2 wherein
   (i) said component (a) has the empirical structural formula $$R_a R_b^1 SiO_q \quad \text{(FORMULA I)}$$

(ii) said component (b) has the empirical structural formula $$R_a H_b SiO_q \quad \text{(FORMULA II)}$$

(iii) and said component (d) has the empirical structural formula $$R_a^2 R_b^3 SiO_q \quad \text{(FORMULA III)}$$

wherein in formulas I, II and III each R is bonded to a silicon atom and is independently selected from the group consisting of monovalent aliphatic and aromatic hydrocarbon radicals, halogenated derivatives thereof, cyanoalkyl radicals and combinations thereof, R having from 1 to 13 carbon atoms;
   R$^1$ is bonded to a silicon atom and is an ethylenically-unsaturated aliphatic hydrocarbon monovalent radical having 2 to 6 carbon atoms;
   R$^2$ and R$^3$ are each bonded to a silicon atom and are free from olefinic unsaturation and are otherwise selected from the same materials useful as R; and
   q equals (4-a-b)/2 wherein a is a number from 0 to 3; b is a number from 0.005 to 2.0; and the sum of a and b is equal to a number from 0.8 to 3.

4. An article according to claim 1 wherein said coating has an average $\Theta$ value of 0.3 Joules/m$^2$ or less.

5. An article according to claim 4 wherein said coating is present in an amount of at least 6 g/m$^2$.

6. An article according to claim 5 wherein said coating is present in an amount of at least 8 g/m$^2$.

7. An article according to claim 4 wherein said coating has an average $\Theta$ value of 0.2 Joules/m$^2$ or less.

8. An article according to claim 7 wherein said coating has an average $\Theta$ value of 0.1 Joules/m$^2$ or less.

9. An article according to claim 1 wherein said component (a) has a viscosity in the range of from 20 to 20,000 centistokes at room temperature prior to being crosslinked.

10. An article according to claim 9 wherein said viscosity is in the range of from 20 to 10,000 centistokes at room temperature.

11. An article according to claim 1 wherein said component (b) has a viscosity in the range of from 5 to 50,000 centistokes at room temperature prior to being crosslinked.

12. An article comprising a substrate having a surface which has been treated with an aziridine-functional composition and coated with at least 3 g/m$^2$ of a coating of a crosslinked organosilicone composition which comprise the polyhydrosilation product of
   (a) an ethylenically unsaturated polysiloxane which has the empirical structural formula $$R_a R_b^1 SiO_q$$

(b) a polyhydrosiloxane which as the empirical formula $$R_a R_b SiO_q$$

and, optionally,
   (c) a platinum- or other metal-containing hydrosilation catalyst in an amount sufficient to facilitate the crosslinking of said components (a) and (b) and
   (d) a nonfunctional polysiloxane which has the structural formula $$R_a^2 R_b^3 SiO_q$$

wherein, in said formulas, each R is bonded to a silicon atom and is independently selected from the group consisting of monovalent aliphatic and aromatic hydrocarbon radicals, halogenated derivatives thereof, cyanoalkyl radicals and combinations thereof, R having from 1 to 13 carbon atoms;
   R$^1$ is bonded to a silicon atom and is an ehtylenically-unsaturated aliphatic hydrocarbon monovalent radical having 2 to 6 carbon atoms;
   R$^2$ and R$^3$ are each bonded to a silicon atom and are free from olefinic unsaturation and are otherwise selected from the same materials useful as R; and
   q equals (4-a-b)/2 wherein a is a number from 0 to 3; b is a number from 0.005 to 2.0; and the sum of a and b is equal to a number from 0.8 to 3.

13. A method of rendering a surface of a substrate capable of repeatedly releasing ice comprising applying a crosslinkable organosilicone composition containing (a) a polysiloxane having terminal ethylenically unsaturated groups, (b) a polyhydrosiloxane, and optionally, (c) a platinum- or other metal-containing hydrosilation catalyst in an amount sufficient to facilitate the crosslinking of said components (a) and (b), and (d) a nonfunctional polysiloxane free from ethylenic unsaturation, wherein said coating is present at a weight of at least 3 g/m² on said surface, and elevating the temperature of said coating to cause it to crosslink and form a coating having an average Θ value of 0.3 joules/m² or less.

14. An uncrosslinked composition containing (a) a polysiloxane having terminal ethylenically unsaturated groups, (b) a polyhydrosiloxane, (c) a platinum- or other metal-containing hydrosilation catalyst in an amount sufficient to facilitate the crosslinking of said components (a) and (b), and (d) at least 0.01 weight percent of a nonfunctional polysiloxane free from ethylenic unsaturation.

15. A composition according to claim 14 containing from 0.01 to 60 weight percent of said component (d).

16. A composition according to claim 15 containing from 0.01 to 40 weight percent of said component (d).

17. A crosslinked film capable of repeatedly releasing ice from a surface thereof which comprises the film resulting from crosslinking a composition containing (a) a polysiloxane having terminal ethylenically unsaturated groups, (b) a polyhydrosiloxane, (c) a platinum- or other metal-containing hydrosilation catalyst in an amount sufficient to facilitate the crosslinking of said components (a) and (b), and (d) at least 0.01 weight percent of a nonfunctional polysiloxane free from ethylenic unsaturation, wherein said coating is present at a weight of at least 3 g/m².

18. A film according to claim 17 wherein said component (d) is present at a level of from 0.01 to 60 weight percent prior to crosslinking.

19. A film according to claim 18 wherein said component (d) is present at a level of from 0.01 to 40 weight percent prior to crosslinking.

20. An ice-releasing element comprising a substrate; a layer of at least 3 g/m² of a crosslinked organosilicone material on a first surface of said substrate which results from the crosslinking of a composition containing (a) a polysiloxane having terminal ethylenically unsaturated groups, (b) a polyhydrosiloxane, (c) a platinum- or other metal-containing hydrosilation catalyst in an amount sufficient to facilitate the crosslinking of said components (a) and (b), and (d) a nonfunctional polysiloxane free from ethylenic unsaturation; an adhesive on a second surface of said substrate.

21. An element comprising a crosslinkable organosilicone composition comprising (a) a polysiloxane having terminal ethylenically unsaturated groups, (b) a polyhydrosiloxane, (c) a platinum- or other metal-containing hydrosilation catalyst in an amount sufficient to facilitate the crosslinking of said components (a) and (b), and (d) a nonfunctional polysiloxane free from ethylenic unsaturation.

* * * * *